United States Patent
Zappa et al.

(10) Patent No.: US 6,428,054 B1
(45) Date of Patent: Aug. 6, 2002

(54) UNIONS FOR DOUBLE-WALL TUBES AND DIES THEREFOR

(75) Inventors: Guido Zappa, Seveso; Massimo Genoni, Sasso Morelli-Imola; Marco Genoni, Milan, all of (IT)

(73) Assignee: Nupi S.p.A., Imola (IT)

(*) Notice: Subject to any disclaimer, the term of this patent is extended or adjusted under 35 U.S.C. 154(b) by 0 days.

(21) Appl. No.: 09/441,445

(22) Filed: Nov. 17, 1999

(30) Foreign Application Priority Data

Nov. 23, 1998 (IT) ........................................ MI980753 U

(51) Int. Cl.[7] ................................................ F16L 39/00
(52) U.S. Cl. .............................. 285/123.15; 285/123.1; 285/133.11; 285/21.1; 425/98; 425/100
(58) Field of Search .............................. 285/21.1, 21.2, 285/123.15, 123.1, 133.11, 93; 425/98, 100, 249

(56) References Cited

U.S. PATENT DOCUMENTS

| | | | | |
|---|---|---|---|---|
| 3,068,563 A | * | 12/1962 | Reverman .................... | 425/100 |
| 3,499,188 A | * | 3/1970 | Johnson ....................... | 425/98 |
| 4,779,652 A | | 10/1988 | Sweeney ..................... | 138/113 |
| 4,886,305 A | * | 12/1989 | Martin ......................... | 285/138 |
| 4,932,257 A | * | 6/1990 | Webb ........................... | 285/21 |
| 5,189,790 A | * | 3/1993 | Streubel et al. ......... | 29/890.149 |
| 5,277,455 A | | 1/1994 | Graves et al. ................. | 285/55 |
| 5,364,130 A | * | 11/1994 | Thalmann .................... | 285/21 |
| 5,398,976 A | | 3/1995 | Webb ............................ | 285/93 |
| 5,400,828 A | | 3/1995 | Ziu et al. ..................... | 138/113 |
| 5,433,484 A | * | 7/1995 | Ewen et al. .................. | 285/21 |
| 5,449,204 A | * | 9/1995 | Greene et al. ........... | 285/133.1 |
| 6,127,662 A | * | 10/2000 | Katz .......................... | 285/21.2 |
| 6,198,081 B1 | * | 3/2001 | Steinmetz et al. ......... | 285/21.2 |

FOREIGN PATENT DOCUMENTS

GB 2318543 4/1998

OTHER PUBLICATIONS

Patent Abstracts of Japan, vol. 17, No. 572 & JP 05 164287 A (Tokyo Gas Co. Ltd.), Oct. 18, 1993.

\* cited by examiner

Primary Examiner—Lynne H. Browne
Assistant Examiner—Kenn Thompson
(74) Attorney, Agent, or Firm—Jacobson Holman, PLLC

(57) ABSTRACT

A union for tubes having a first external wall and a second internal wall coaxial with the first to define a chamber around a central duct. The union includes at least two seats for reception each of one end of a tube to be connected. Each seat includes a first surface designed to adhere to an end segment of the first wall of a tube inserted in the seat and a second surface coaxial with the first and designed to adhere to an end segment of the second wall of the tube. Between the first and second surfaces of the union there is a connection surface. The union includes in it first ducts which lead into the connection surfaces to provide connection between the chambers of tubes inserted in the seats and second ducts which lead into spaces circumscribed by the second surfaces to provide connection between the central ducts of the tubes.

14 Claims, 4 Drawing Sheets

UNIONS FOR DOUBLE-WALL TUBES AND DIES THEREFOR

Figure 1:
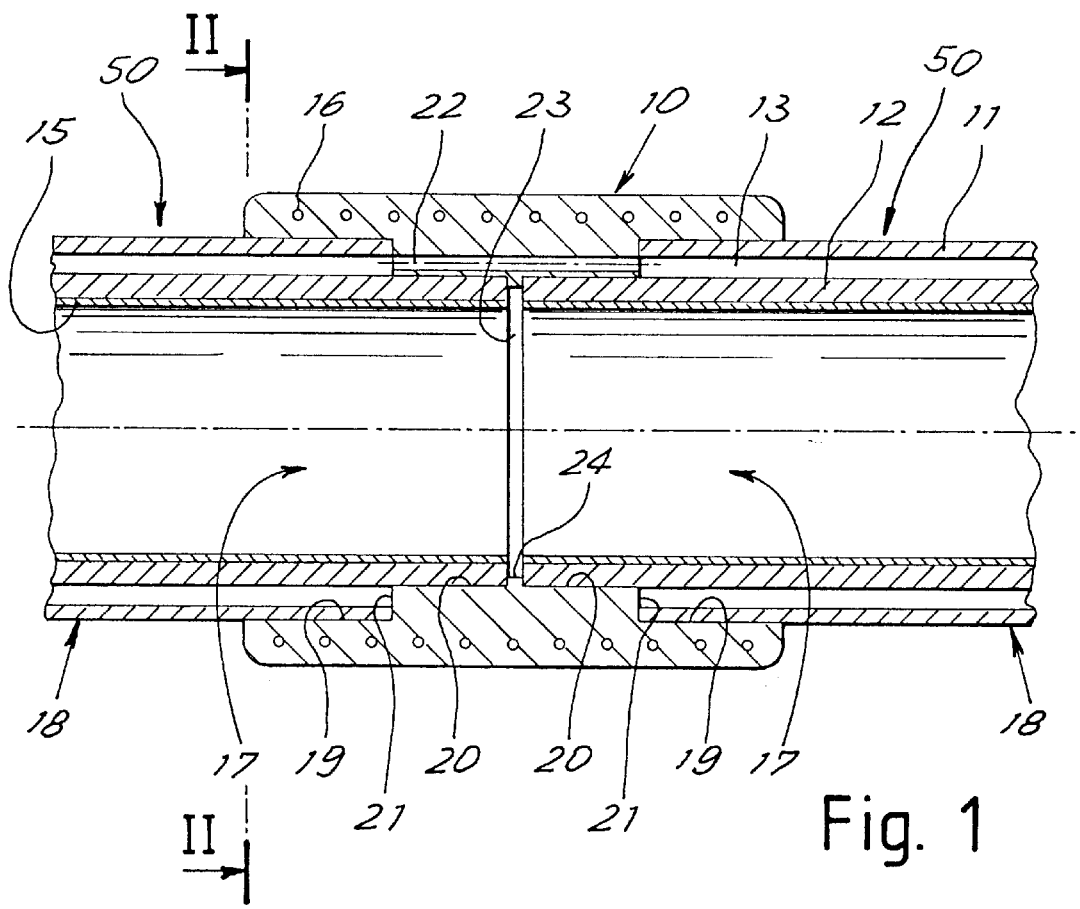

The present invention relates to unions for tubes of the double wall type i.e. tubes in which the internal duct is surrounded by a chamber or jacket coaxial therewith. The present invention also relates to dies for making said unions.

For example such tubes are used for conveyance of polluting liquids while holding the external jacket under pressure and passing the liquid through the central duct. If the tube is punctured the resulting pressure drop in the external jacket is detected and supply of the conveyed liquid can be promptly stopped.

For such tubes there is the difficulty of providing unions rapidly as it is necessary to ensure continuity both of the duct and the coaxial chamber without leakage between them.

In U.S. Pat. No. 5,398,976 there was proposed a reducer sleeve made of elastomer and having one end with a first diameter suited for receiving a double-wall tube and the other end with a second diameter suited for being traversed only by the internal core of the tube. In a zone intermediate between its ends the sleeve has a connection traversing the sleeve wall and designed for connecting the end of a separate flexible tube with the interior of the sleeve. In use a double-wall tube should be prepared by removing the external wall of the tube from a point onward. The sleeve is fitted on the tube at the terminal end of the external tube wall so that the double-wall tube will enter the sleeve from the end with larger diameter but only the internal core of the tube emerges from the reduced diameter end. The ends of the sleeve are clamped on the tube so that the terminal edge of the tube external wall is sealed inside the sleeve in a zone where the sleeve has the tube connection. In this manner the sleeve seals the air space in the double-wall tube and connects it to the tube grafted to the connection on the outside of the sleeve. According to the contents of U.S. Pat. No. 5,398,976 this sleeve can serve to terminate the external wall of the tube so as to reduce the double-wall tube to a single-wall tube consisting of the internal wall of the double-wall tube. Two double-wall tube sections can be connected by using two sleeves of the above mentioned type to reduce to a single-wall tube the tube ends to be connected and then jointing the single-wall tubes thus obtained with a normal known tube union. The air spaces terminated in the sleeves are connected together by means of a short length of tube with both ends grafted to the sleeve connections.

Such a procedure is clearly laborious and requires rather high manual skill while exposing to risk of leaks due to breakage of the tube core in the uncovered zone between the two sleeves.

The general purpose of the present invention is to overcome the drawbacks of the prior art by supplying unions easy, safe and fast to use for double-wall tubes. Another purpose is to supply dies therefor.

In view of this purpose it is sought to provide in accordance with the present invention a tube union having a first external wall and a second internal wall coaxial with the first to define a chamber around a central duct with the union comprising at least two seats for reception each of one end of a tube to be connected and each seat comprising a first surface designed to adhere to an end segment of the first wall of a tube inserted in the seat and a second surface coaxial with the first and designed to adhere to an end segment of the second wall of said tube with there being between the first and second surfaces of each seat of the union a connection surface with the union comprising at least one first duct leading onto said connection surfaces to provide connection between the chambers of tubes inserted in the seats and at least one second duct leading into spaces circumscribed by the second surfaces to provide connection between the central ducts of said tubes.

Again in accordance with the principles of the present invention it is sought to provide a die for production of unions for double-wall tubes with air space comprising plugs for making seats to receive the ends of the tubes to be jointed and broaches for making ducts for connection of the air space of the tubes when the die is in pressing position with the broaches intersecting the plugs and entering them through the mouthpieces of said seats.

Figure 2:
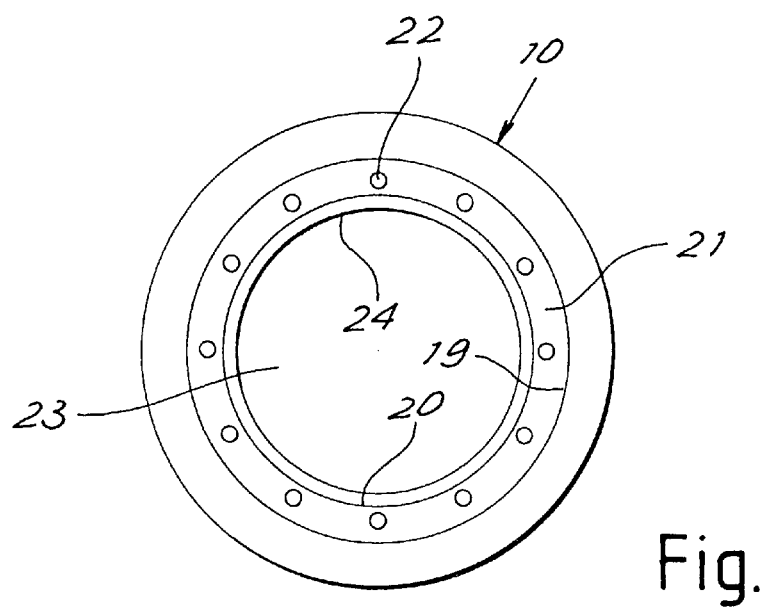

To clarify the explanation of the innovative principles of the present invention and its advantages compared with the prior art there are described below with the aid of the annexed drawings possible embodiments thereof by way of non-limiting examples applying said principles. In the drawings:

FIG. 1 shows a cross section view of a union in accordance with the present invention, FIG. 2 shows a view along plane of cut II—II of FIG. 1, and FIGS. 3–7 show diagrammatic views of different unions provided in accordance with the principles of the present invention.

With reference to the FIGS FIG. 1 shows a first union indicated as a whole by reference number 10, in the form of a sleeve.

The unions in accordance with the present invention are designed to be employed for permanent connection of double-wall tubes 50 i.e. the type having a first external wall 11 and a second internal wall 12 coaxial with the first to define a chamber 13 around a central duct 14. If necessary the tube can even be the multilayer type with the innermost layer 15 suited for contact with the fluid conveyed and external layers suited for jointing with the union. The joint can be made by various methods designed for permanent connection such as electric furnace melting by means of heating resistances 16 embedded in the sleeve material, polyfusion or gluing with suitable glue. The sleeve will be produced with suitable material or compositions of members of suitable materials as may be readily imagined by those skilled in the art so that the selected joint system can also be used by virtue of the material or materials composing the tubes to be jointed so that the appropriate surfaces of the union can adhere permanently to the corresponding tube walls.

The union of FIG. 1 comprises two seats 17 for reception each of one end of a tube 18 to be connected.

Each seat comprises a first surface 19 designed to adhere to an end segment of the first wall 11 of a tube inserted in the seat and a second surface 20 coaxial with the first and designed to adhere to an end segment of the second wall 12 of the tube.

Between the first and second surfaces of the union there is a connection surface 21 which can advantageously constitute the head beat for at least the external wall 11 of the tube inserted in the seat.

In the embodiment shown in FIG. 1 first and second surfaces are arranged sequentially in the seat with the connection surface defining a ledge between them to receive a tube with one end of the second wall 12 extending beyond the end of the first wall 11. In this manner the first wall adheres externally to the union surface 19 and the second wall adheres to the union surface 20 with its face turned into the space 13.

The union comprises in its body first ducts 22 opening onto said connection surfaces 21 and second ducts 23 opening into spaces circumscribed by the second surfaces 20. As clarified in the figure, in this manner the first ducts 22 provide the connection between the chambers 13 of the tubes inserted in the seats while the second ducts 23 provide the connection between the central ducts of said tubes.

As may be seen in FIG. 1 the two seats can be arranged coaxially and in opposite directions. In this case the central duct 23 can be reduced and the two seats can be virtually extensions of each other with only a possible separating circumferential ribbing 24 designed to define a head beat for the inner wall 12 of a tube inserted in the seat.

As may be seen in FIG. 2 in the embodiment of FIG. 1 the first ducts 22 are a plurality and surround the second central duct 23 or main axial duct peripherally.

Figure 3:
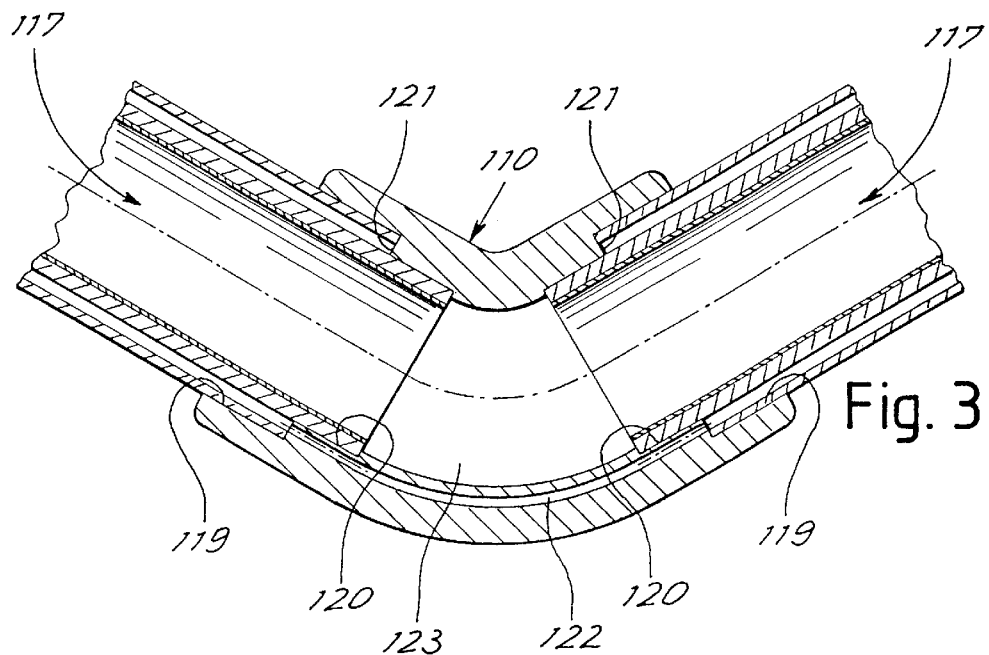

As shown in FIG. 3 a union in accordance with the present invention could be provided to form a joint member such as an elbow or a bend. For the sake of convenience members similar to those of FIG. 1 are indicated with the same numbers increased by one hundred. There is accordingly a union 110 with seats 117 having coupling surfaces 119, 120 connected by a surface 121 with connecting ducts 122, and 123.

Figure 4:
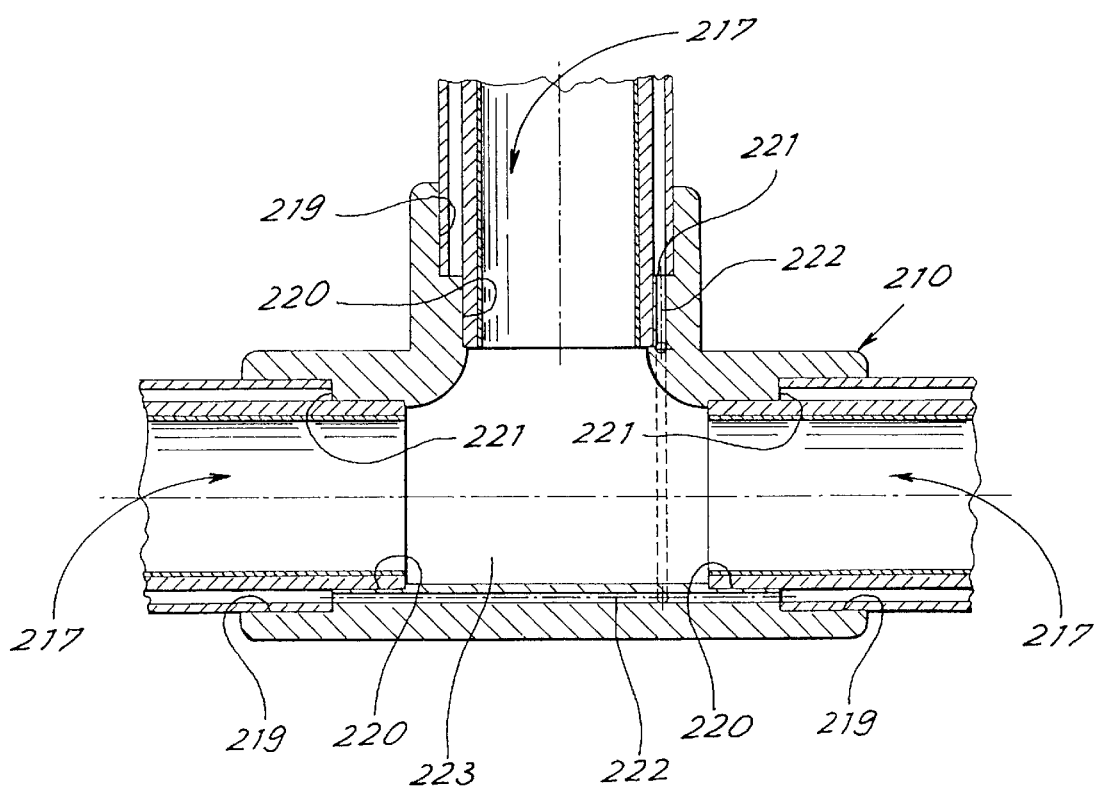

FIG. 4 shows a T union applying the principles of the present invention. Parts similar to those of FIG. 1 are indicated by the same reference numbers increased by two hundred. There is thus a T union 210 with seats 217 having connection surfaces 219, 220 for external wall and internal wall of double-wall tubes. The two connection surfaces of each seat are connected by means of an intermediate connecting surface 221. Passages or ducts 222, 223 connect the seats 217 to provide continuity respectively between the air spaces and between the internal ducts of the tubes jointed in the seats 217.

Figure 5:
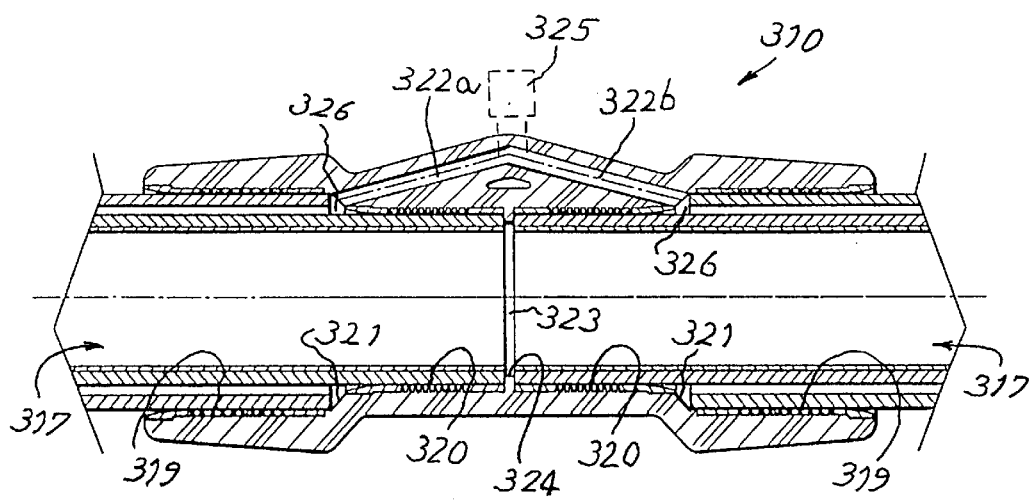

FIG. 5 shows a variant embodiment of a linear union in accordance with the present invention. In this alternative embodiment the union (indicated as a whole by reference number 310) has opposite seats 317 having connection surfaces 319, 320 for external wall and internal wall of a pair of double-wall tubes to be jointed. The seats 317 are aligned and connected by the passage 323. Between the wall 319 and the wall 320 of each seat there is a connecting surface 321. The surface 321 is inclined to define an annular chamber 326 for connection with the air space of the tube in the seat. A duct 322 connects the seats near the connection surfaces to provide continuity between the air spaces of the tubes jointed in the seats 317. The duct 322 can be connected to a valve 325 which permits easy access to the air space of the jointed tubes for example for pressure measurement or addition of fluid to the air space or taking it therefrom. Advantageously the duct 322 is divided in two semi-ducts 322a, 322b having their axis inclined with respect to the main axis of the union seats to meet in an intermediate zone in which to connect the valve 325. The union zone 310 in which passes the duct 322 is outside the main body of the union.

Figure 6:
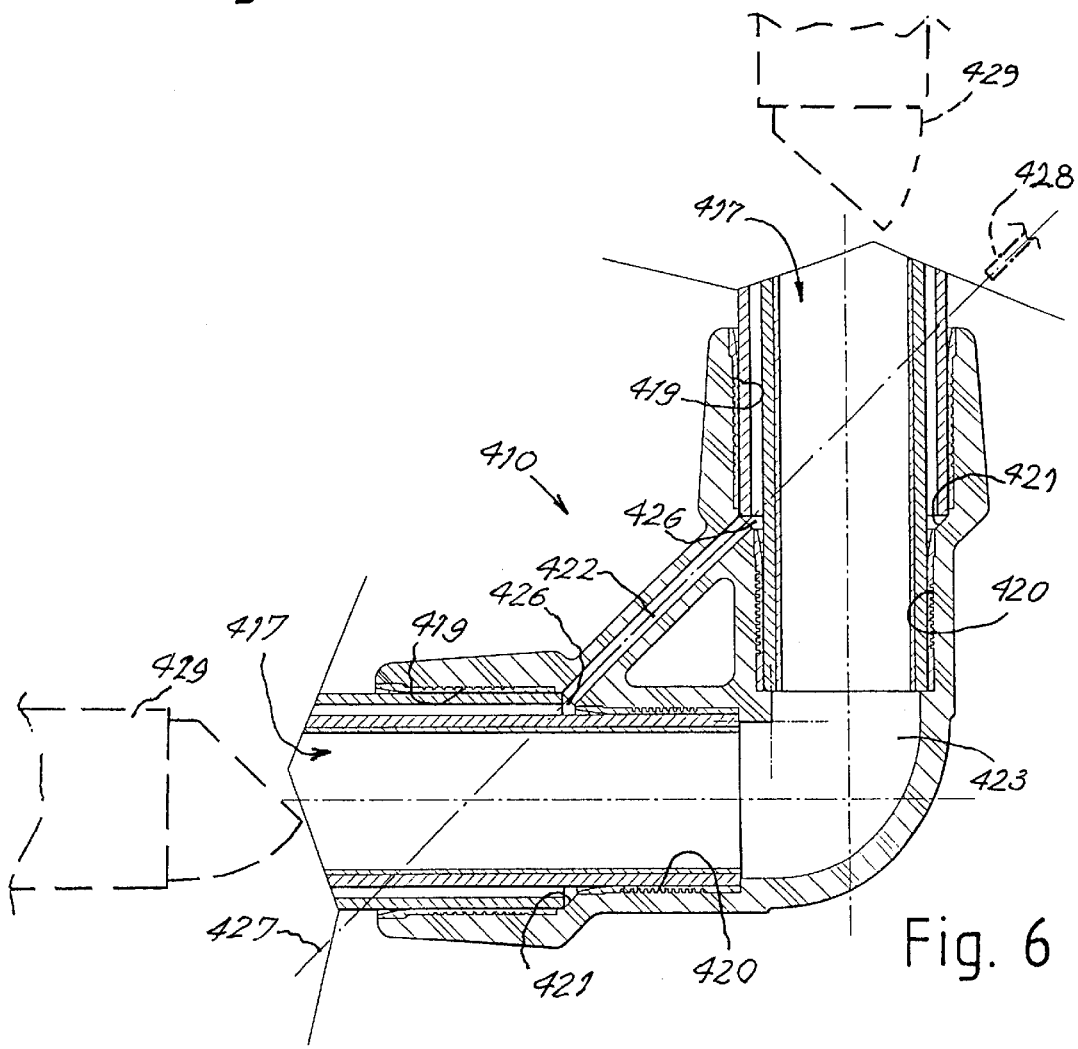

FIG. 6 shows a variant embodiment of a bend union provided in accordance with the present invention. The union (indicated as a whole by reference number 410) has seats 417 having connection surfaces 419, 420 for the external wall and internal wall of a pair of double-wall tubes to be jointed. The seats 417 are connected by the curved passage 423. Between the wall 419 and the wall 420 of each seat there is a connecting surface 421 inclined to define an annular chamber 426 for connection with the air space of the tube in the seat. A duct 422 connects the seats near the connection surfaces to provide continuity between the air spaces of the tubes jointed in the seats 417. The duct 422 arranged between the arms of the curve has a rectilinear axis 427 which is inclined with respect to the main axes of the seats 417 and its virtual extension emerges from the seats 417 through their tube introduction mouths. In this manner construction of the union is facilitated because the production die can have a broach running along the axis 427 which traverses the plugs 429 for production of the seats 417 and the duct 422.

Figure 7:
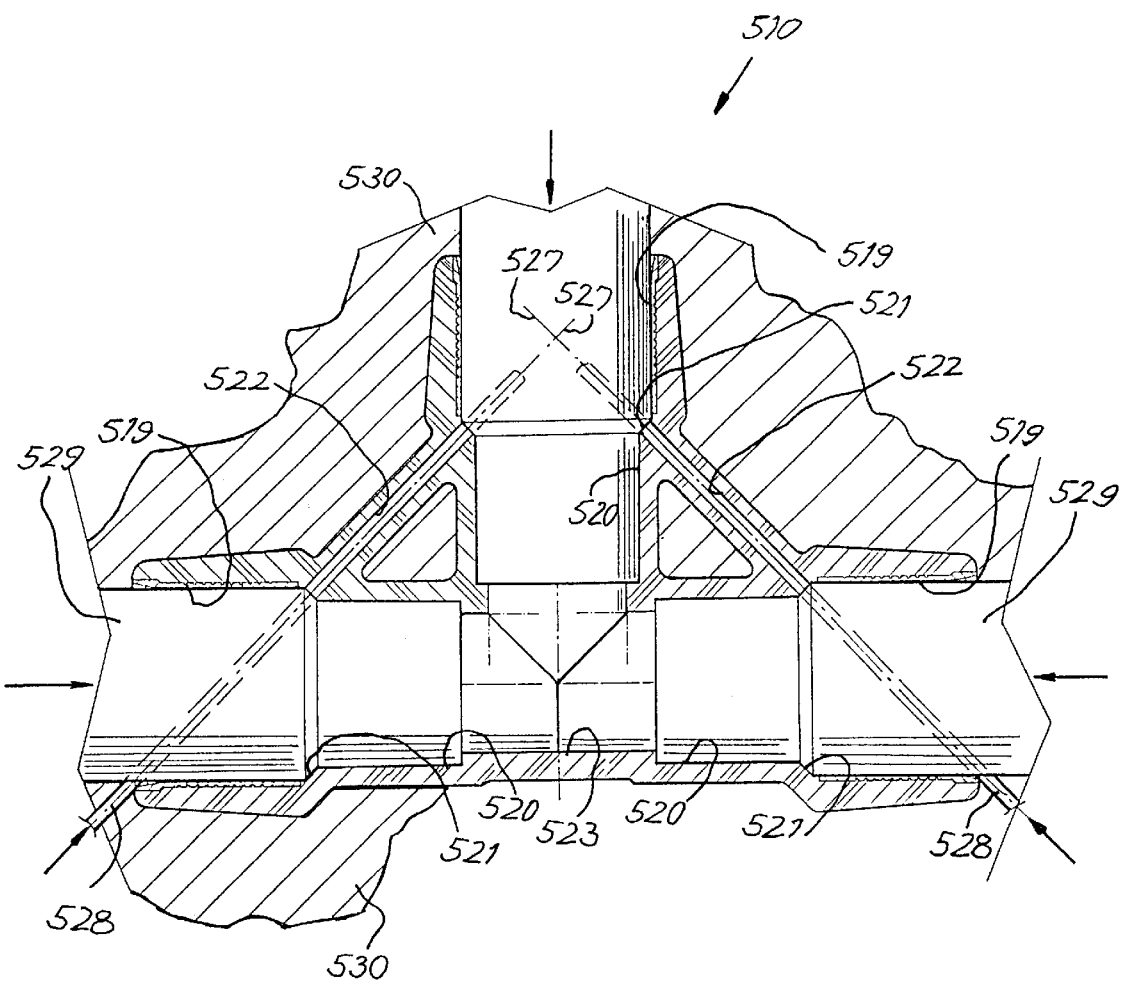

FIG. 7 shows an embodiment of a T union in accordance with the present invention indicated by reference number 510. This FIG. also shows the plugs 529 and broaches 528 of a production die 530. The die with its ducts for feeding the plastic material and its various other accessories is shown only partially as the rest is readily imaginable to those skilled in the art on the basis of the drawings and description given here.

The union 510 has seats 517 having connection surfaces 519, 520 for the external wall and internal wall of double-wall tubes to be jointed. The three seats 517 are connected by means of the passage to T 523. Between wall 519 and wall 520 of each seat there is a connecting surface 521 inclined to define an annular chamber as shown in the embodiments of FIGS. 5 and 6 around the head of the air space of a tube inserted in the seat. A pair of ducts 522 connect the seats near the connecting surfaces to provide continuity between the air spaces of the tubes jointed in the seats 517. The ducts 522 have a rectilinear axis 527 which is inclined with respect to the main axes of the seats 517 so that each duct intersects a pair of connecting surfaces 521. The virtual extension of the axes emerges from one side of the aligned seats 517 and from the other the two axes intersect. In this manner construction of the T union is facilitated because the production die 530 can have broaches 528 traversing the production plugs 529 of the aligned seats 517 (horizontal in FIG. 7) and meeting inside the third plug 529 (vertical in FIG. 7).

As clarified by FIGS. 6 and 7, as the broaches are inserted and strike against the interior of the plugs correct positioning of the broaches is assured.

It is now clear that the predetermined purposes have been achieved by making available union members for permanent connection of double-wall tubes. It is noted that with a union in accordance with the present invention it is possible to connect several double-wall tubes in a single operation for example by fusion in an electric furnace.

Naturally the above description of embodiments applying the innovative principles of the present invention is given by way of non-limiting example of said principles within the scope of the exclusive right claimed here.

For example the union can be made up of an innermost part of material suited for connection with the tube material and an outer part of different material selected for example for its mechanical characteristics.

In addition the characteristics of the various unions shown can be taken from one union to the other.

What is claimed is:

1. Union for double-wall tubes having a first external wall and a second internal wall coaxial with the first external wall to define a chamber around a central duct, the union being a single piece construction and comprising:

at least two seats for reception each of one end of a double-wall tube to be connected, each seat comprising a first surface designed to adhere to an exterior surface of an end segment of the first external wall of a double-wall tube inserted in the seat, and a second surface coaxial with the first surface and designed to adhere to an exterior surface of an end segment of the second internal wall of said double-wall tube, at least one first duct to provide connection between the chambers of the double-wall tubes inserted in the seats, at least one second duct which opens into spaces circumscribed by the second surface of each seat to provide connection between the central ducts of said double-wall tubes, a connection surface in each seat connecting the first surface to the second surface of each seat, said at least one first duct opening onto said connection surfaces, and the first and second surfaces of each seat being arranged sequentially in the seat for receiving a double-wall tube with the end of the second internal wall extending beyond the end of the first external wall.

2. Union in accordance with claim 1 wherein it comprises means for fusion in an electric furnace of first and second surfaces for their adhesion to the walls of a tube inserted in the seat.

3. Union in accordance with claim 1 wherein it comprises two seats arranged coaxially and in opposite directions.

4. Union in accordance with claim 3 wherein that the second duct of a seat is an extension of the second duct of the other with a separating circumferential ribbing designed to define a head beat for the internal wall of a tube inserted in a seat.

5. Union in accordance with claim 1 wherein the first ducts surround peripherally a second duct.

6. Union in accordance with claim 1 wherein the connecting surface defines an annular space around the internal wall of a tube received in the seat with there leading into said space at least one first duct and the tube air space.

7. Union in accordance with claim 1 wherein the axis of said at least one first duct is inclined with respect to the axis of the seat and its virtual extension emerges through the seat mouth.

8. Union in accordance with claim 1 wherein the at least one first duct is connected to an outlet located on the exterior of the union.

9. Union in accordance with claim 1 wherein the seats are two with axes inclined one with respect to the other to provide a curve with said at least one first duct being arranged between the curve arms.

10. Union in accordance with claim 1 wherein the seats are three arranged in a T.

11. Die for production of double-wall tube unions with air space comprising plugs for production of the seats for reception of the tube ends to be jointed and broaches for production of ducts for connection of the air space of the tubes when the die is in position for pressing the broaches intersecting the plugs and entering them through the mouth of said seats.

12. Die in accordance with claim 11 wherein the broaches have a head end which strikes in a seat in the plug.

13. Union for tubes having a first external wall and a second internal wall coaxial with the first to define a chamber around a central duct with the union comprising two seats arranged coaxially and in opposite directions for reception each of one end of a tube to be connected and each seat comprising a first surface designed to adhere to-an end segment of the first wall of a tube inserted in the seat and a second surface coaxial with the first and designed to adhere to an end segment of the second wall of said tube with there being between the first and second surfaces of each seat of the union a connection surface with the union comprising in it at least one first duct which leads onto said connection surfaces to provide connection between the chambers of tubes inserted in the seats and at least one second duct which leads into spaces circumscribed by the second surfaces to provide connection between the central ducts of said tubes.

14. Union in accordance with claim 13, wherein the second duct of a seat is an extension of the second duct of the other with a separating circumferential ribbing designed to define a head beat for the internal wall of a tube inserted in a seat.

* * * * *